US012060495B2

(12) United States Patent
Chasser et al.

(10) Patent No.: US 12,060,495 B2
(45) Date of Patent: *Aug. 13, 2024

(54) COATING COMPOSITIONS, DIELECTRIC COATINGS FORMED THEREFROM, AND METHODS OF PREPARING DIELECTRIC COATINGS

(71) Applicant: PPG Industries Ohio, Inc., Cleveland, OH (US)

(72) Inventors: Anthony Michael Chasser, Greensburg, PA (US); Paul F. Cheetham, Wexford, PA (US); Holli Allison Gonder-Jones, Akron, OH (US); Stacey Lynn Orzech, Brunswick, OH (US); Brian Edward Woodworth, Glenshaw, PA (US); Brent Allen Schwartz, Wapakoneta, OH (US); Kevin Lee Ford, Harrod, OH (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/454,671

(22) Filed: Nov. 12, 2021

(65) Prior Publication Data
US 2022/0073781 A1 Mar. 10, 2022

Related U.S. Application Data

(63) Continuation of application No. 16/603,330, filed as application No. PCT/US2018/026573 on Apr. 6, 2018, now Pat. No. 11,180,674.

(60) Provisional application No. 62/483,035, filed on Apr. 7, 2017.

(51) Int. Cl.
*C09D 163/00* (2006.01)
*C08G 59/42* (2006.01)
*C08K 5/00* (2006.01)
*C08K 5/21* (2006.01)
*C09D 5/03* (2006.01)
*C09D 133/02* (2006.01)
*C09D 167/00* (2006.01)
*H01B 13/32* (2006.01)

(52) U.S. Cl.
CPC ....... *C09D 163/00* (2013.01); *C08G 59/4261* (2013.01); *C08G 59/4276* (2013.01); *C09D 5/03* (2013.01); *C09D 133/02* (2013.01); *C09D 167/00* (2013.01); *H01B 13/321* (2013.01); *C08K 5/0025* (2013.01); *C08K 5/21* (2013.01)

(58) Field of Classification Search
CPC ...... C09D 175/04; C09D 175/06; C09D 5/03; C09D 163/00–10; C09D 133/02; C09D 167/00–04; C08G 59/4261; C08G 59/4276
See application file for complete search history.

(56) References Cited

U.S. PATENT DOCUMENTS

| | | |
|---|---|---|
| 3,245,925 A | 4/1966 | Watson |
| 4,499,239 A | 2/1985 | Murakami |
| 4,568,606 A | 2/1986 | Hart et al. |
| 4,698,398 A | 10/1987 | Kordomenos et al. |
| 4,698,399 A | 10/1987 | Kordomenos et al. |
| 4,698,400 A | 10/1987 | Kordomenos et al. |
| 4,698,402 A | 10/1987 | Kordomenos et al. |
| 4,708,995 A | 11/1987 | Kordomenos et al. |
| 4,714,743 A | 12/1987 | Kordomenos et al. |
| 4,714,744 A | 12/1987 | Kordomenos et al. |
| 4,714,745 A | 12/1987 | Kordomenos et al. |
| 4,742,129 A | 5/1988 | Kordomenos et al. |
| 4,769,425 A | 9/1988 | Dervan et al. |
| 4,921,913 A | 5/1990 | Pettit, Jr. |
| 5,168,110 A | 12/1992 | Van Den Elshout et al. |
| 5,183,835 A | 2/1993 | Gross et al. |
| 5,209,987 A | 5/1993 | Penneck et al. |
| 5,272,187 A | 12/1993 | Gross et al. |
| 5,288,802 A | 2/1994 | Walters et al. |
| 5,380,565 A | 1/1995 | Gross et al. |
| 5,543,464 A | 8/1996 | Decker et al. |
| 5,580,937 A | 12/1996 | Neumann et al. |
| H1667 H | 7/1997 | Poincloux et al. |
| 5,710,214 A | 1/1998 | Chou et al. |
| 6,103,825 A | 8/2000 | Frischinger et al. |

(Continued)

FOREIGN PATENT DOCUMENTS

| | | |
|---|---|---|
| CN | 105038447 A | 11/2015 |
| CN | 105885499 A | 8/2016 |

(Continued)

OTHER PUBLICATIONS

Machine English translation of the abstract of JP6010322A.
Jerrold B. Billmyer, "Resiflow P-64F Flow Control Agent for Powder Coatings", Estron Chemical, Dec. 23, 1980, p. p.I, XP055483772, Retrieved from the Internet: URL:http://estron.com/sites/default/files/TDS/Resiflow%20P-64F%2009-22-I 7%20TDS.pdf.
Liming et al., "Coating Process and Apparatus", Chemical Industry Press, Jul. 31, 2004, pp. 212-214. (Relevant for reasons stated in the Chinese Office Action).
Wiley SpectraBase; available at http://spectrabase.com/spectrum/5f2ZMCMV9LC (accessed Nov. 7, 2020).*

*Primary Examiner* — Kregg T Brooks
(74) *Attorney, Agent, or Firm* — Charles M. Yeomans

(57) ABSTRACT

The present invention relates to a powder coating composition for preparing a dielectric coating. The powder coating composition includes: (a) an epoxy functional polymer; (b) a poly-carboxylic acid functional polyester polymer reactive with the epoxy functional polymer and which has an acid value of less than 100 mg KOH/g; and (c) a poly-carboxylic acid functional (meth)acrylate polymer reactive with the epoxy functional polymer. Further, if a colorant is present, the powder coating composition comprises 35 weight % or less of the colorant, based on the total solids weight of the coating composition.

26 Claims, No Drawings

(56) References Cited

U.S. PATENT DOCUMENTS

| | | |
|---|---|---|
| 6,117,952 A | 9/2000 | Finter et al. |
| 6,187,875 B1 | 2/2001 | Bergmans et al. |
| 6,251,999 B1 | 6/2001 | Rardon et al. |
| 6,359,080 B1 | 3/2002 | Marx et al. |
| 6,407,181 B1 | 6/2002 | Daly et al. |
| 6,491,973 B1 | 12/2002 | Davydov et al. |
| 6,531,189 B1 | 3/2003 | Blatter et al. |
| 6,593,401 B1 | 7/2003 | Park et al. |
| 6,599,993 B1 | 7/2003 | Norris et al. |
| 6,787,188 B1 | 9/2004 | Metcalfe |
| 6,994,888 B2 | 2/2006 | Metcalfe |
| 7,223,477 B2 | 5/2007 | Muthiah |
| 7,615,585 B2 | 11/2009 | Gaglani et al. |
| 8,637,581 B2 | 1/2014 | Moens |
| 9,505,946 B2 | 11/2016 | Karlsen et al. |
| 11,180,674 B2 * | 11/2021 | Chasser ............... C09D 163/00 |
| 2006/0166001 A1 * | 7/2006 | Moens .................. C09D 5/032 428/413 |
| 2007/0073005 A1 | 3/2007 | Ijima et al. |
| 2009/0110934 A1 | 4/2009 | Cinoman et al. |
| 2012/0070593 A1 | 3/2012 | Carlson et al. |
| 2012/0196112 A1 | 8/2012 | Kliesch et al. |
| 2013/0059942 A1 | 3/2013 | Ono et al. |
| 2018/0361429 A1 | 12/2018 | Comley et al. |

FOREIGN PATENT DOCUMENTS

| | | | |
|---|---|---|---|
| EP | 0730012 A2 | 9/1996 | |
| EP | 2085440 A1 * | 8/2009 | ........... C09D 167/02 |
| EP | 2248864 A1 | 11/2010 | |
| JP | 6010322 B2 | 10/2016 | |
| KR | 1020090018836 A | 2/2009 | |
| KR | 1020170005053 A | 1/2017 | |
| WO | 2007140131 A2 | 12/2007 | |
| WO | 2015169806 A1 | 11/2015 | |

* cited by examiner

COATING COMPOSITIONS, DIELECTRIC COATINGS FORMED THEREFROM, AND METHODS OF PREPARING DIELECTRIC COATINGS

CROSS REFERENCE TO RELATED APPLICATIONS

This application claims priority to U.S. Nonprovisional application Ser. No. 16/603,330, filed Oct. 7, 2019. U.S. Nonprovisional application Ser. No. 16/603,330 claims priority to U.S. Provisional Application No. 62/483,035, filed Apr. 7, 2017, both of which are incorporated herein by reference in its entirety.

FIELD OF THE INVENTION

The present invention relates to coating compositions, dielectric coatings formed from the coating compositions, and methods of preparing the dielectric coatings.

BACKGROUND OF THE INVENTION

Substrates, such as metal substrates including metal electrical components, are often protected with a high dielectric strength material to provide insulating properties. For example, components have been coated with a dielectric coating to provide insulating properties. While dielectric coatings can provide insulating properties, it is difficult to obtain good insulating properties at low film thicknesses. Thus, it is desirable to develop improved dielectric coatings that provide good electrical insulation at low film thicknesses.

SUMMARY OF THE INVENTION

The present invention relates to a powder coating composition for preparing a dielectric coating. The powder coating composition comprises: (a) an epoxy functional polymer; (b) a poly-carboxylic acid functional polyester polymer reactive with the epoxy functional polymer and which comprises an acid value of less than 100 mg KOH/g; and (c) a poly-carboxylic acid functional (meth)acrylate polymer reactive with the epoxy functional polymer. Further, if a colorant is present, the powder coating composition comprises 35 weight % or less of the colorant, based on the total solids weight of the coating composition.

The present invention also relates to a substrate coated with a coating formed from the previously described coating composition. The coating has a dielectric strength of greater than 2.5 kV at a dry film thickness of less than 8 mils.

In addition, the present invention relates to a method of forming a dielectric coating comprising (a) applying the previously described powder coating composition over at least a portion of a substrate, and (b) curing the powder coating composition to form a coating. The coating formed therefrom has a dielectric strength of greater than 2.5 kV at a dry film thickness of less than 8 mils.

DESCRIPTION OF THE INVENTION

For purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances. Further, in this application, the use of "a" or "an" means "at least one" unless specifically stated otherwise. For example, "a" polymer, "a" powder coating composition, and the like refer to one or more of any of these items.

As indicated, the present invention relates to a powder coating composition for preparing a high dielectric strength coating. As used herein, a "powder coating composition" refers to a coating composition embodied in solid particulate form as opposed to liquid form. Thus, the components described herein can be combined to form a curable solid particulate powder coating composition. For instance, the components described herein that form the coating composition can be combined as a curable solid particulate powder coating composition that is free flowing. As used herein, the term "free flowing" with regard to curable solid particulate powder coating compositions refers to a solid particulate powder composition having a minimum of clumping or aggregation between individual particles.

Further, a "dielectric coating" refers to a coating that is electrically insulating. As will be described in further detail herein, the dielectric coating of the present invention can provide a dielectric strength of greater than 2.5 kV as measured by a Sefelec Dielectrimeter RMG12AC-DC and in accordance with ASTM D149-09 Hipot test.

In accordance with the present invention, the powder coating composition for preparing the dielectric coating comprises: (a) an epoxy functional polymer; (b) a poly-carboxylic acid functional polyester polymer reactive with the epoxy functional polymer and which comprises an acid value of less than 100 mg KOH/g; and (c) a poly-carboxylic acid functional (meth)acrylate polymer reactive with the epoxy functional polymer. It is appreciated that the epoxy functional polymer, poly-carboxylic acid functional polyester polymer, and poly-carboxylic acid functional (meth)acrylate polymer can react to form a hydroxyl functional reaction product.

As used herein, the term "polymer" refers to oligomers, homopolymers (e.g., prepared from a single monomer species), copolymers (e.g., prepared from at least two monomer species), and graft polymers. The term "resin" is used interchangeably with "polymer." Further, the term "crosslinker" refers to a molecule comprising two or more functional groups that are reactive with other functional groups and which is capable of linking two or more monomers or polymer molecules through chemical bonds.

As previously described, the powder coating composition of the present invention comprises at least two different poly-carboxylic acid functional polymers: (i) a poly-carboxylic acid functional polyester polymer; and (ii) a poly-carboxylic acid functional (meth)acrylate polymer. As used herein, a "poly-carboxylic acid functional polymer" refers to a polymer having two or more carboxylic acid functional groups.

The poly-carboxylic acid functional polyester polymer used in the powder coating composition of the present invention can have an acid value of less than 100 mg KOH/g or less than 80 mg KOH/g. The poly-carboxylic acid functional polyester polymer can further have an acid value of at least 60 mg KOH/g. The poly-carboxylic acid functional polyester polymer can also have, for example, an acid value of from 60 mg KOH/g to 100 mg KOH/g, or from 60 mg KOH/g to 80 mg KOH/g. The poly-carboxylic acid functional polyester polymer can be formed from various materials such as poly(ethylene terephthalate) for example.

The poly-carboxylic acid functional polyester polymer can comprise at least 20 weight %, at least 25 weight %, at least 30 weight %, at least 35 weight %, or at least 40 weight % of the powder coating composition, based on the total solids weight of the powder coating composition. The poly-carboxylic acid functional polyester polymer can comprise up to 60 weight % or up to 50 weight % of the powder coating composition, based on the total solids weight of the powder coating composition. The poly-carboxylic acid functional polyester polymer can also comprise an amount within a range such as from 20 to 60 weight % or from 30 to 50 weight % of the powder coating composition, based on the total solids weight of the powder coating composition.

As indicated, the powder coating composition also comprises a poly-carboxylic acid functional (meth)acrylate polymer. As used herein, "(meth)acrylate" and like terms refers both to the acrylate and the corresponding methacrylate. The poly-carboxylic acid functional (meth)acrylate polymer can comprise at least 0.05 weight %, at least 0.1 weight %, at least 0.5 weight %, at least 1 weight %, or at least 2 weight % of the powder coating composition, based on the total solids weight of the powder coating composition. The poly-carboxylic acid functional (meth)acrylate polymer can comprise up to 10 weight %, up to 5 weight %, or up to 3 weight % of the powder coating composition, based on the total solids weight of the powder coating composition. The poly-carboxylic acid functional (meth)acrylate polymer can also comprise an amount within a range such as from 0.05 to 10 weight %, or from 0.1 to 5 weight %, or from 1 to 3 weight % of the powder coating composition, based on the total solids weight of the powder coating composition.

The poly-carboxylic acid functional polyester polymer and the poly-carboxylic acid functional (meth)acrylate polymer can be combined in the powder coating composition to provide a desired weight ratio. For example, the poly-carboxylic acid functional polyester polymer and the poly-carboxylic acid functional (meth)acrylate polymer can be combined in the powder coating composition to provide a weight ratio of the poly-carboxylic acid functional polyester polymer to the poly-carboxylic acid functional (meth)acrylate polymer of 1:1 or greater, or 5:1 or greater, or 10:1 or greater, or 15:1 or greater, or 20:1 or greater.

The powder coating composition can also include additional carboxylic acid functional polymers including, but not limited to, carboxylic acid functional polyurethane polymers, polyamide polymers, polyether polymers, polysiloxane polymers, vinyl resins, copolymers thereof, and combinations thereof. Further, any of the previously described carboxylic acid functional polymers can have any of a variety of additional functional groups including, but not limited to, amine groups, hydroxyl groups, thiol groups, carbamate groups, amide groups, urea groups, and combinations thereof. Alternatively, the powder coating composition of the present invention can be free of such additional poly-carboxylic acid functional polymers.

The total amount of carboxylic acid functional polymers can comprise at least 20 weight %, at least 30 weight %, or at least 40 weight % of the powder coating composition, based on the total solids weight of the powder coating composition. The total amount of carboxylic acid functional polymers can comprise up to 70 weight %, up to 60 weight %, or up to 50 weight % of the powder coating composition, based on the total solids weight of the powder coating composition. The total amount of carboxylic acid functional polymers can also comprise an amount within a range such as from 20 to 70 weight %, or from 30 to 60 weight %, or from 40 to 50 weight % of the powder coating composition, based on the total solids weight of the powder coating composition.

The carboxylic acid functional polymers can also be formed from recycled materials. For example, the powder coating composition of the present invention can comprise a poly-carboxylic acid functional polyester prepared from at least one recycled material. A non-limiting example of a recycled material that can be used to form the poly-carboxylic acid functional polyester is recycled poly(ethylene terephthalate).

As previously described, the powder coating composition of the present invention also comprises an epoxy functional polymer that is reactive with at least the poly-carboxylic acid functional polyester polymer and the poly-carboxylic acid functional (meth)acrylate polymer. It is appreciated that the epoxy functional polymer comprises two or more epoxy functional groups and acts as a crosslinker when reacted with the carboxylic acid functional polymers. Non-limiting examples of suitable epoxy functional polymers include, but are not limited to, diglycidyl ethers of bisphenol A, polyglycidyl ethers of polyhydric alcohols, polyglycidyl esters of polycarboxylic acids, and combinations thereof. Non-limiting examples of suitable epoxy resins are also commercially available from NanYa Plastics under the trade name NPES-903, and from Hexion under the trade names EPON™ 2002 and EPON 2004™.

The epoxy functional polymer can have an equivalent weight of at least 500 or at least 700. The epoxy functional polymer can also comprise an equivalent weight of up to 1000 or up to 5100. The epoxy functional polymer can comprise an equivalent weight within the range of 500 to 5100 or from 700 to 1000. As used herein, "equivalent weight" refers to the average weight molecular weight of a resin divided by the number of functional groups. As such, the equivalent weight of the epoxy functional polymer is determined by dividing the average weight molecular weight of the epoxy resin by the total number of epoxide groups and any other optional functional groups that are not an epoxide. Further, the average weight molecular weight is determined by gel permeation chromatography relative to linear polystyrene standards of 800 to 900,000 Daltons as measured with a Waters 2695 separation module with a Waters 410 differential refractometer (RI detector). Tetrahydrofuran (THF) is used as the eluent at a flow rate of 1 ml min-1, and two PLgel Mixed-C (300×7.5 mm) columns is used for separation.

It is appreciated that the epoxy functional polymer can comprise one or multiple types of epoxy functional polymers. When multiple epoxy functional polymers are used, the multiple epoxy functional polymers can have the same or different equivalent weights. For instance, a first epoxy functional polymer can have an equivalent weight that is greater than an equivalent weight of a second epoxy functional polymer. The epoxy functional polymers can also include additional functional groups besides the epoxy functional groups including, but not limited to, any of the previously described functional groups. Alternatively, the epoxy functional polymer can be free of any one, or all, of the previously described functional groups besides the epoxy functional groups.

The epoxy functional polymer can comprise at least 20 weight %, at least 30 weight %, or at least 40 weight % of the powder coating composition, based on the total solids weight of the powder coating composition. The epoxy functional polymer can comprise up to 60 weight % or up to 50 weight % of the powder coating composition, based on the total solids weight of the coating composition. The epoxy functional polymer can also comprise an amount within a range such as from 20 to 60 weight %, or from 30 to 50 weight %, or from 40 to 50 weight % of the powder coating composition, based on the total solids weight of the powder coating composition.

The poly-carboxylic acid functional polyester polymer and the epoxy functional polymer can also be combined in the powder coating composition to provide a desired weight ratio. For example, the poly-carboxylic acid functional polyester polymer and the epoxy functional polymer can be combined in the powder coating composition to provide a weight ratio of the poly-carboxylic acid functional polyester polymer to the epoxy functional polymer of 0.5:1 to 1:0.5, or from 0.8:1 to 1:0.8, or from 0.9:1 to 1:0.9, or from 0.95:1 to 1:0.95, or at a ratio of 1:1.

The carboxylic acid functional polymers and the epoxy functional polymer of the powder coating composition are reacted to form a reaction product comprising hydroxyl functional groups. The reaction product can comprise one or multiple hydroxyl groups. For example, the reaction product can comprise multiple pendant hydroxyl groups and, optionally, terminal hydroxyl groups.

The powder coating composition of the present invention can also comprise an isocyanate functional crosslinker that is reactive with the previously described reaction product comprising hydroxyl functional groups. The isocyanate crosslinker can provide additional properties including, for example, a higher crosslink density for increased chemical and abrasion resistance.

The isocyanate functional crosslinker can include various types of polyisocyanates. Polyisocyanates that can be used include aliphatic and aromatic diisocyanates as well as higher functional polyisocyanates. Non-limiting examples of suitable polyisocyanates include isophorone diisocyanate (IPDI), dicyclohexylmethane 4,4'-diisocyanate (H12MDI), cyclohexyl diisocyanate (CHDI), m-tetramethylxylylene diisocyanate (m-TMXDI), p-tetramethylxylylene diisocyanate (p-TMXDI), ethylene diisocyanate, 1,2-diisocyanatopropane, 1,3-diisocyanatopropane, 1,6-diisocyanatohexane (hexamethylene diisocyanate or HDI), 1,4-butylene diisocyanate, lysine diisocyanate, 1,4-methylene bis-(cyclohexyl isocyanate), toluene diisocyanate (TDI), m-xylylenediisocyanate (MXDI) and p-xylylenediisocyanate, 4-chloro-1,3-phenylene diisocyanate, 1,5-tetrahydro-naphthalene diisocyanate, 4,4'-dibenzyl diisocyanate, and 1,2,4-benzene triisocyanate, xylylene diisocyanate (XDI), and mixtures or combinations thereof.

The isocyanate crosslinker can comprise a blocked isocyanate functional crosslinker. A "blocked isocyanate" refers to a compound with isocyanate functional groups that have been reacted with a blocking agent and which prevents the isocyanate functionality from reacting until the blocking agent is removed upon exposure to an external stimulus such as heat. Non-limiting examples of blocking agents include phenols, pyridinols, thiophenols, methylethylketoxime, amides, caprolactam, imidazoles, and pyrazoles. The isocyanate can also include a uretdione isocyanate such as a uretdione internally blocked isocyanate adduct.

The isocyanate functional crosslinker can comprise at least 0.1 weight %, at least 1 weight %, or at least 3 weight % of the powder coating composition, based on the total solids weight of the powder coating composition. The isocyanate functional crosslinker can comprise up to 10 weight %, up to 8 weight %, or up to 5 weight % of the powder coating composition, based on the total solids weight of the powder coating composition. The isocyanate functional crosslinker can also comprise an amount within a range such as from 0.1 to 10 weight %, or from 1 to 8 weight %, or from 3 to 5 weight % of the powder coating composition, based on the total solids weight of the powder coating composition.

The coating composition can optionally include additional film-forming resins, such as any of the previously described resins, that are free of carboxylic acid groups and which include different functional groups such any of the other previously described functional groups. Further, the coating composition can also optionally include additional crosslinkers that are reactive with any of the previously described resins including the optional additional film-forming resins. Non-limiting examples of additional crosslinkers that can optionally be used with the compositions described herein include carbodiimides, polyhydrazides, aziridines, alkylated carbamate resins, polyamines, polyamides, aminoplasts, melamines, hydroxyalkyl ureas, hydroxyalkyl amides, and any combination thereof.

The powder coating composition can also include additional materials. Non-limiting examples of materials that can be used with the powder coating compositions of the present invention include plasticizers, anti-oxidants, flow and surface control agents as such waxes (e.g., amide waxes), thixotropic agents, slip aids, catalysts such as metal catalysts (e.g., tin catalysts), anti-gassing agents such as benzoin, reaction inhibitors, texturizers, and other customary auxiliaries.

The coating composition of the present invention is also free of colorants or contain a controlled amount of colorants, which has been found to improve dielectric strength of the final coating. As used herein, a "colorant" refers to any substance that imparts color and/or other opacity and/or other visual effect to the composition. Colorants are typically used in a variety of forms, such as discrete particles, dispersions, solutions, and/or flakes.

Example colorants include pigments (organic or inorganic), dyes, and tints, such as those used in the paint industry and/or listed in the Dry Color Manufacturers Association (DCMA), as well as special effect compositions. A colorant may include, for example, a finely divided solid powder that is insoluble, but wettable, under the conditions of use. A colorant can be organic or inorganic and can be agglomerated or non-agglomerated.

Example pigments and/or pigment compositions include, but are not limited to, carbazole dioxazine crude pigment, azo, monoazo, diazo, naphthol AS, salt type (flakes), benzimidazolone, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DPPBO red"), titanium dioxide, carbon black, and mixtures or combinations thereof. The terms "pigment" and "colored filler" can be used interchangeably.

Example dyes include, but are not limited to, those that are solvent and/or aqueous based such as phthalo green or blue, iron oxide, bismuth vanadate, and mixtures or combinations thereof.

Example tints include, but are not limited to, pigments dispersed in water-based or water-miscible carriers such as AQUA-CHEM 896 commercially available from Degussa, Inc., CHARISMA COLORANTS and MAXITONER INDUSTRIAL COLORANTS commercially available from Accurate Dispersions Division of Eastman Chemical, Inc.

The powder coating composition of the present invention can comprise 35 weight % or less, or 30 weight % or less, or 25 weight % or less, or 20 weight % or less, or 15 weight % or less, or 10 weight % or less, or 5 weight % or less, or 1 weight % or less, or 0.1 weight % or less, of a colorant such as a pigment, based on the total solids weight of the powder coating composition. The powder coating composition can also contain less than 0.05 weight % or less than 0.01 weight % of a colorant such as a pigment, based on the total solids weight of the powder coating composition.

Further, the coating composition can be substantially free, essentially free, or completely free of a colorant such as a pigment. The term "substantially free of a colorant" means that the coating composition contains less than 1000 parts per million by weight (ppm) of a colorant based on the total solids weight of the composition, "essentially free of a colorant" means that the coating composition contains less than 100 ppm of a colorant based on the total solids weight of the composition, and "completely free of a colorant" means that the coating composition contains less than 20 parts per billion by weight (ppb) of a colorant based on the total solids weight of the composition.

The coating composition can be prepared by mixing the previously described poly-carboxylic acid functional polyester polymer, poly-carboxylic acid functional (meth)acrylate polymer, epoxy functional polymer, optional isocyanate functional crosslinker, and optional additional components. The components are mixed such that a homogenous mixture is formed. The components can be mixed using art-recognized techniques and equipment such as with a Prism high speed mixer for example. When a solid coating composition is formed, the homogenous mixture is next melted and further mixed. The mixture can be melted with a twin screw extruder or a similar apparatus known in the art. During the melting process, the temperatures will be chosen to melt mix the solid homogenous mixture without curing the mixture. The homogenous mixture can be melt mixed in a twin screw extruder with zones set to a temperature of 75° C. to 125° C., such as from 85° C. to 115° C. or at 100° C.

After melt mixing, the mixture is cooled and re-solidified. The re-solidified mixture is then ground such as in a milling process to form a solid particulate curable powder coating composition. The re-solidified mixture can be ground to any desired particle size. For example, in an electrostatic coating application, the re-solidified mixture can be ground to an average particle size of at least 10 microns or at least 20 microns and up to 100 microns as determined with a Beckman-Coulter LS™ 13 320 Laser Diffraction Particle Size Analyzer following the instructions described in the Beckman-Coulter LS™ 13 320 manual. Further, the particle size range of the total amount of particles in a sample used to determine the average particle size can comprise a range of from 1 micron to 200 microns, or from 5 microns to 180 microns, or from 10 microns to 150 microns, which is also determined with a Beckman-Coulter LS™ 13 320 Laser Diffraction Particle Size Analyzer following the instructions described in the Beckman-Coulter LS™ 13 320 manual.

The coating composition of the present invention can be applied to a wide range of substrates known in the coatings industry. For example, the coating compositions of the present invention can be applied to automotive substrates, industrial substrates, aerocraft and aerocraft components, marine substrates and components, packaging substrates, electronics, architectural substrates, and the like.

Specific non-limiting substrates include cars, trucks, ships, vessels, on-shore and off-shore installations, storage tanks, windmills, power industry substrates such as nuclear plants, power wires, batteries and battery components, bus bars, metal wires, copper or aluminum conductors, wood flooring and furniture, apparel, housings and circuit boards, glass and transparencies, sports equipment, including golf balls, stadiums, buildings, bridges, and the like.

The substrates can be, for example, metallic or non-metallic substrates that require electrical insulating properties. Metallic substrates include, but are not limited to, tin, steel (including electrogalvanized steel, cold rolled steel, hot-dipped galvanized steel, among others), aluminum, aluminum alloys, zinc-aluminum alloys, steel coated with a zinc-aluminum alloy, and aluminum plated steel. Non-metallic substrates include polymeric, plastic, polyester, polyolefin, polyamide, cellulosic, polystyrene, polyacrylic, poly(ethylene naphthalate), polypropylene, polyethylene, nylon, EVOH, polylactic acid, other "green" polymeric substrates, poly(ethyleneterephthalate) (PET), polycarbonate, polycarbonate acrylobutadiene styrene (PC/ABS), polyamide, wood, veneer, wood composite, particle board, medium density fiberboard, cement, stone, glass, paper, cardboard, textiles, leather both synthetic and natural, and the like.

The coating compositions of the present invention are particularly beneficial when applied directly to a metallic substrate or a pretreated metallic substrate to form dielectric coatings that provide insulating properties.

The coating compositions of the present invention can be applied by any means standard in the art, such as spraying, electrostatic spraying, a fluidized bed process, and the like. After the coating compositions are applied to a substrate, the compositions can be cured or at least partially cured such as with heat, or with other means such as actinic radiation to form a coating. As used herein, the terms "curable", "cure", and the like mean that at least a portion of the resinous materials in a composition is crosslinked or crosslinkable. The term "actinic radiation" refers to electromagnetic radiation that can initiate chemical reactions. Actinic radiation includes, but is not limited to, visible light, ultraviolet (UV) light, and infrared radiation (IR).

In some examples, the powder coating composition of the present invention is cured with heat, such convection heating within a range of from 250° F. to 500° F. for 2 to 40 minutes, or within a range of from 250° F. to 400° F. for 10 to 30 minutes, or within a range of from 300° F. to 400° F. for 10 to 30 minutes. The coating composition of the present invention can also be cured with infrared radiation in which peak metal temperatures can reach 400° F. to 500° F. in about 10 seconds. The elevated heat ramping with infrared radiation allows for fast cure times. In some examples, the powder coating composition of the present invention is cured with infrared radiation to heat the composition within a range of from 300° F. to 550° F. for 1 to 20 minutes, or within a range of from 350° F. to 525° F. for 2 to 10 minutes, or within a range of from 370° F. to 515° F. for 5 to 8 minutes.

It is appreciated that the powder coating composition of the present invention can be cured with multiple types of heat sources such as both convection heating and infrared radiation. For example, the powder coating composition of the present invention can be partially cured with convection heating or infrared radiation, and then completely cured with a different heat source chosen from convection heating and infrared radiation.

The powder coating compositions of the present invention can also be applied in multiple applications over a substrate. For instance, a first powder coating composition according to the present invention can be applied over at least a portion of a substrate. A second powder coating composition according to the present invention can be applied over at least a portion of the first coating composition. The first powder coating composition can optionally be cured or at least partially cured before applying the second powder coating composition. Alternatively, the second powder coating composition can be applied over at least a portion of the first coating composition. The first and second coating composition can then be cured together at the same time. The powder coating compositions can be cured with any of the methods previously described.

Coatings formed from a single powder coating composition according to the present invention can be applied to a dry film thickness of less than 12 mils, less than 10 mils, less than 8 mils, or less than 6 mils, or less 5 mils, or less than 4 mils, or less than 3 mils, or less than 2 mils. It is appreciated that, when multiple powder coating compositions are applied, each composition can be applied to separately provide any of the previously described dry film thicknesses. For instance, when two separate powder coating compositions of the present invention are applied, each individual powder coating composition can be applied at any of the previously described dry film thicknesses.

It has been found that the dielectric coatings of the present invention can provide good dielectric strength over substrates. For example, the dielectric coating of the present invention can provide a dielectric strength of greater than 2.5 kV at a film thickness of less 8 mils as measured by a Sefelec Dielectrimeter RMG12AC-DC and in accordance ASTM D149-09 Hipot test. The dielectric coating of the present invention can also provide a dielectric strength of greater than 4.0 kV at a dry film thickness of less than 5 mils, or less than 4 mils, or less than 2 mils, as measured by a Sefelec Dielectrimeter RMG12AC-DC and in accordance ASTM D149-09 Hipot test. The dielectric coating of the present invention can also provide a dielectric strength of at least 6.0 kV at a dry film thickness of 3 mils or less, as measured by a Sefelec Dielectrimeter RMG12AC-DC and in accordance ASTM D149-09 Hipot test. The dielectric coating of the present invention can also provide a dielectric strength of at least 8.0 kV, or at least 10 kV, at a dry film thickness of 12 mils or less, or 10 mils or less, as measured by a Sefelec Dielectrimeter RMG12AC-DC and in accordance ASTM D149-09 Hipot test.

The dielectric coatings of the present invention also provide additional properties including, but not limited to, good adhesive properties. For instance, the dielectric coating of the present invention can exhibit an adhesive strength of 5B when applied to a substrate as determined in accordance with ASTM D3359-17.

The present invention is also directed to a method of preparing a dielectric coating. The method comprises applying the coating composition of the present invention over at least a portion of a substrate, and curing the coating composition to form a coating. The coating composition can include any of the previously described coating compositions. The method of applying the coating composition can also include applying multiple applications of the coating composition according to the present invention over the substrate.

The curing of the coating composition can also include any of the previously described curing steps. For example, the coating composition can be cured with infrared radiation, convection heating, or a combination thereof to form the dielectric coating. Further, when multiple coating compositions according to the present invention are applied, each coating composition can be independently partially or completely cured before applying the next coating composition. Alternatively, the multiple coating compositions can be cured together at the same time.

The following examples are presented to demonstrate the general principles of the invention. The invention should not be considered as limited to the specific examples presented. All parts and percentages in the examples are by weight unless otherwise indicated.

Examples 1-6

Preparation of a Powder Coating Composition

Curable powder coating compositions were prepared from the components listed in Table 1.

TABLE 1

| Component | Comp. Ex. 1 (gram) | Ex. 2 (gram) | Ex. 3 (gram) | Ex. 4 (gram) | Ex. 5 (gram) | Ex. 6 (gram) |
|---|---|---|---|---|---|---|
| Polyester Resin[1] | 229.7 | 143.6 | 0 | 481.9 | 470.7 | 459.4 |
| Polyester Resin[2] | 0 | 0 | 239.4 | 0 | 0 | 0 |
| Epoxy Resin[3] | 224.2 | 140.1 | 215 | 470.4 | 459.4 | 448.4 |
| Acrylic Resin[4] | 11.1 | 7.0 | 11.1 | 22.2 | 22.2 | 22.2 |
| Tin Catalyst[5] | 0.6 | 0.6 | 0.6 | 1.1 | 1.1 | 1.1 |
| Flow Additive[6] | 4.4 | 4.4 | 4.4 | 8.9 | 8.9 | 8.9 |
| Flow Additive[7] | 5.0 | 3.1 | 5.0 | 10.0 | 10.0 | 10.0 |
| Degassing Additive[8] | 2.2 | 2.2 | 2.2 | 4.5 | 4.5 | 4.5 |

TABLE 1-continued

| Component | Ex. 1 (gram) | Comp. Ex. 2 (gram) | Ex. 3 (gram) | Ex. 4 (gram) | Ex. 5 (gram) | Ex. 6 (gram) |
|---|---|---|---|---|---|---|
| Blocked Isocycanate[9] | 22.2 | 22.2 | 22.2 | 0 | 22.2 | 44.5 |
| $TiO_2$[10] | 0 | 187.5 | 0 | 0 | 0 | 0 |

[1]Carboxyl-functional polyester with acid value of 69 mg KOH/g.
[2]Carboxyl-functional polyester with acid value of 70 mg KOH/g prepared with recycled poly(ethylene terephthalate).
[3]NPES-903, commercially available from Nan Ya Plastics Corp.
[4]Joncryl® 819, carboxyl functional solid grade acrylic resin, commercially available from BASF.
[5]Butaflow BT-71, commercially available from Estron Chemical.
[6]Acrylic/silica flow and leveling control agent, commercially available from Estron Chemical Inc.
[7]Micromide 520L, finely micronized EBS wax, commercially available from Micro Powders, Inc.
[8]Benzoin, commercially available from Mitsubishi Chemical Corporation.
[9]VESTAGON® BF 1540, internally blocked polyisocyanate adduct, commercially available from Evonik.
[10]White pigment.

Each of the components listed in Table 1 were weighed in a container and mixed in a prism high speed mixer for 30 seconds at 3500 RPM to form dry homogeneous mixtures. The mixtures were then melt mixed in a Werner Pfleiderer 19 mm twin screw extruder with an aggressive screw configuration and a speed of 500 RPM. The first zone was set at 50° C., and the second, third, and fourth zones were set at 110° C. The feed rate was such that a torque of 50-60% was observed on the equipment. The mixtures were dropped onto a set of chill rolls to cool and re-solidify the mixtures into solid chips. The chips were ground in a Mikro ACM®-1 Air Classifying Mill to obtain a particle size of 5 to 150 microns with a majority of the particles being from 20 to 40 microns. The resulting coating compositions were solid particulate powder coating compositions that were free flowing.

Example 7

Application and Evaluation of Powder Coatings

The curable powder coating compositions prepared in Examples 1-6 were applied by electrostatic spray onto aluminum substrates. During application, a first layer of 4-7 mils was applied and then gelled with a conventional oven at 350° F. for 2 minutes. A second layer of 4-7 mils was then applied and then a full bake was done with a conventional oven at 350° F. for 30 minutes.

Each of the coatings prepared from the compositions were evaluated for dielectric strength, as measured by a Sefelec Dielectrimeter RMG12AC-DC and in accordance with ASTM D149-09 Hipot test. The parameters of the testing were as follows: Voltage limit: 12 kV DC, $I_{max}$ Limit: 4.0 mA, 3 seconds ramp, 1 second dwell, 2 second fall. The results of the Hipot test are shown in Table 2.

TABLE 2

| Property | Ex. 1 | Comp. Ex. 2 | Ex. 3 | Ex. 4 | Ex. 5 | Ex. 6 |
|---|---|---|---|---|---|---|
| Film thickness (mils) | 12.3 | 10.6 | 12.9 | 10 | 10 | 10 |
| Dielectric Strength (kV) | 10.2 | 6.2 | 10.1 | 11.4 | 10.2 | 11.0 |

As shown in Table 2, the coatings formed from the powder coating compositions of Examples 1 and 3-6 exhibited improved dielectric strength as compared to the coating of Comparative Example 2.

Example 8

Application and Evaluation of Powder Coatings

A curable powder coating composition prepared in Example 1 was applied by electrostatic spray onto aluminum substrates. During application, a first layer of 5 mils was applied and then gelled with a shortwave IR oven at 315° F.-345° F. for 2 minutes. A second layer of 5 mils was then applied and then a full bake with a shortwave IR oven at 415° F.-515° F. for 5 minutes.

The coating prepared from the composition was evaluated for dielectric strength, as measured by a Sefelec Dielectrimeter RMG12AC-DC and in accordance with ASTM D149-09 Hipot test. The parameters of the testing were as follows: Voltage limit: 12 kV DC, $I_{max}$ Limit: 4.0 mA, 3 seconds ramp, 1 second dwell, 2 second fall. The results of the Hipot test are shown in Table 3.

TABLE 3

| Property | Example 1 |
|---|---|
| Film thickness (mils) | 10 |
| Dielectric Strength (kV) | 10.8 |

As shown in Table 3, the coating formed from the powder coating composition of Example 1 using IR for curing also exhibited good dielectric strength.

The present invention also includes the following clauses.

Clause 1: A powder coating composition for preparing a dielectric coating comprising: (a) an epoxy functional polymer; (b) a poly-carboxylic acid functional polyester polymer reactive with the epoxy functional polymer and which comprises an acid value of less than 100 mg KOH/g; and (c) a poly-carboxylic acid functional (meth)acrylate polymer reactive with the epoxy functional polymer, wherein, if a colorant is present, the powder coating composition comprises 35 weight % or less of the colorant, based on the total solids weight of the coating composition.

Clause 2: The powder coating composition of clause 1, further comprising (d) an isocyanate functional crosslinker reactive with a hydroxyl functional reaction product obtained from the epoxy functional polymer, poly-carboxylic acid functional polyester polymer, and poly-carboxylic acid functional (meth)acrylate polymer.

Clause 3: The powder coating composition of clause 2, wherein the isocyanate functional crosslinker is a blocked isocyanate functional crosslinker.

Clause 4: The powder coating composition of clause 2, wherein the isocyanate functional crosslinker is a uretdione isocyanate.

Clause 5: The powder coating composition of any one of clauses 1-5, wherein the epoxy functional polymer is a diglycidyl ether of bisphenol A.

Clause 6: The powder coating composition of any one of clauses 1-5, wherein the poly-carboxylic acid functional polyester polymer is formed from at least one recycled material.

Clause 7: The powder coating composition of clause 6, wherein the at least one recycled material is poly(ethylene terephthalate).

Clause 8: The powder coating composition of any one of clauses 1-7, wherein the powder coating composition is substantially free of a colorant, based on the total solids weight of the coating composition.

Clause 9: The powder coating composition of any one of clauses 1-8, wherein the poly-carboxylic acid functional polyester polymer comprises an acid value of from 60 mg KOH/g to 80 mg KOH/g.

Clause 10: A substrate at least partially coated with a coating formed from the powder coating composition of any one of clauses 1-9, wherein the coating has a dielectric strength of greater than 2.5 kV at a dry film thickness of less than 8 mils.

Clause 11: The coated substrate of clause 10, wherein the coating has a dielectric strength of greater than 4.0 kV at a dry film thickness of less than 5 mils.

Clause 12: The coated substrate of clauses 10 or 11, wherein the substrate comprises a metal.

Clause 13: A battery or battery component at least partially coated with a coating formed from the powder coating composition of any one of clauses 1-9.

Clause 14: A metal wire at least partially coated with a coating formed from the powder coating composition of any one of clauses 1-9.

Clause 15: A method of forming a dielectric coating comprising: (a) applying a powder coating composition over at least a portion of a substrate, the powder coating composition comprising: (i) an epoxy functional polymer; (ii) a poly-carboxylic acid functional polyester polymer reactive with the epoxy functional polymer and which comprises an acid value of less than 100 mg KOH/g; and (iii) a poly-carboxylic acid functional (meth)acrylate polymer reactive with the epoxy functional polymer, wherein, if a colorant is present, the powder coating composition comprises 35 weight % or less of the colorant, based on the total solids weight of the coating composition; and (b) curing the powder coating composition to form a coating, wherein the coating has a dielectric strength of greater than 2.5 kV at a dry film thickness of less than 8 mils.

Clause 16: The method of clause 15, wherein the powder coating composition is at least partially cured by applying infrared radiation.

Clause 17: The method of clauses 15 or 16, wherein the method comprises applying a first powder coating composition according to (a) over at least a portion of the substrate, and subsequently applying a second powder coating composition according to (a) over at least a portion of the first coating composition.

Clause 18: The method of any one of clauses 15-17, wherein the first powder coating composition is cured before applying the second coating composition.

Clause 19: The method of any one of clauses 15-17, wherein the first powder coating composition and the second powder coating composition are cured together at the same time after applying the second powder coating composition.

Clause 20: The method of any one of clauses 15-19, wherein the powder coating composition further comprises (iv) an isocyanate functional crosslinker reactive with a hydroxyl functional reaction product obtained from the epoxy functional polymer, poly-carboxylic acid functional polyester polymer, and poly-carboxylic acid functional (meth)acrylate polymer.

Clause 21: The method of clause 20, wherein the crosslinker comprises a blocked isocyanate functional crosslinker.

Clause 22: The method of clause 20, wherein the isocyanate functional crosslinker is a uretdione isocyanate.

Clause 23: The method of any one of clauses 15-22, wherein the powder coating composition is substantially free of a colorant, based on the total solids weight of the coating composition.

Clause 24: The method of any one of clauses 15-23, wherein the substrate is a battery or battery component.

Clause 25: The method of any one of clauses 15-23, wherein the substrate is a metal wire.

Whereas particular embodiments of this invention have been described above for purposes of illustration, it will be evident to those skilled in the art that numerous variations of the details of the present invention may be made without departing from the invention as defined in the appended claims.

The invention claimed is:

1. A powder coating composition for preparing a dielectric coating comprising:
   a) an epoxy functional polymer;
   b) a poly-carboxylic acid functional polyester polymer reactive with the epoxy functional polymer and which comprises an acid value of less than 100 mg KOH/g; and
   c) a poly-carboxylic acid functional (meth)acrylate polymer reactive with the epoxy functional polymer,
   wherein a weight ratio of the poly-carboxylic acid functional polyester to the poly-carboxylic acid functional (meth)acrylate polymer is 20:1 or greater,
   wherein the powder coating composition comprises up to 50 weight % of the poly-carboxylic acid functional polyester polymer, based on the total resin solids weight of the powder coating composition,
   wherein, if a colorant is present, the powder coating composition comprises 35 weight % or less of the colorant, based on the total solids weight of the coating composition,
   wherein (i) the coating composition further comprises d) an isocyanate functional crosslinker reactive with a hydroxyl functional reaction product obtained from the epoxy functional polymer, poly-carboxylic acid functional polyester polymer, and poly-carboxylic acid functional (meth)acrylate polymer and/or (ii) a coating formed from the powder coating composition has a dielectric strength of greater than 2.5 kV at a dry film thickness of less than 8 mils.

2. The powder coating composition of claim 1, wherein the powder coating composition comprises the isocyanate functional crosslinker.

3. The powder coating composition of claim 2, wherein the isocyanate functional crosslinker is a blocked isocyanate functional crosslinker or a uretdione isocyanate.

4. The powder coating composition of claim 1, wherein the epoxy functional polymer is a diglycidyl ether of Bisphenol A.

5. The powder coating composition of claim 1, wherein the epoxy functional polymer comprises an amount within a range of from 30 to 50 weight % of the powder coating composition, based on the total resin solids weight of the powder coating composition.

6. The powder coating composition of claim 1, wherein the poly-carboxylic acid functional polyester polymer comprises an acid value of from 60 mg KOH/g to 80 mg KOH/g.

7. A substrate at least partially coated with a coating formed from the powder coating composition of claim 1, wherein the coating has a dielectric strength of greater than 2.5 kV at a dry film thickness of less than 8 mils.

8. The coated substrate of claim 7, wherein the coating has a dielectric strength of greater than 4.0 kV at a dry film thickness of less than 5 mils.

9. The coated substrate of claim 7, wherein the substrate comprises a metal.

10. A battery or battery component at least partially coated with a coating formed from the powder coating composition of claim 1.

11. A metal wire at least partially coated with a coating formed from the powder coating composition of claim 1.

12. A method of forming a dielectric coating comprising:
a) applying a powder coating composition over at least a portion of a substrate, the powder coating composition comprising:
   i) an epoxy functional polymer;
   ii) a poly-carboxylic acid functional polyester polymer reactive with the epoxy functional polymer and which comprises an acid value of less than 100 mg KOH/g; and
   iii) a poly-carboxylic acid functional (meth)acrylate polymer reactive with the epoxy functional polymer,
   wherein, if a colorant is present, the powder coating composition comprises 35 weight % or less of the colorant, based on the total solids weight of the coating composition,
   wherein a weight ratio of the poly-carboxylic acid functional polyester to the poly-carboxylic acid functional (meth)acrylate polymer is 20:1 or greater,
   wherein the powder coating composition comprises up to 50 weight % of the poly-carboxylic acid functional polyester polymer, based on the total resin solids weight of the powder coating composition; and
b) curing the powder coating composition to form a coating,
wherein the coating has a dielectric strength of greater than 2.5 kV at a dry film thickness of less than 8 mils.

13. The method of claim 12, wherein the powder coating composition is at least partially cured by applying infrared radiation.

14. The method of claim 12, wherein the method comprises applying a first powder coating composition according to (a) over at least a portion of the substrate, and subsequently applying a second powder coating composition according to (a) over at least a portion of the first coating composition.

15. The method of claim 14, wherein the first powder coating composition is cured before applying the second coating composition.

16. The method of claim 14, wherein the first powder coating composition and the second powder coating composition are cured together at the same time after applying the second powder coating composition.

17. The method of claim 12, wherein the substrate is a battery or battery component.

18. The method of claim 12, wherein the substrate is a metal wire.

19. A powder coating composition for preparing a dielectric coating comprising:
a) an epoxy functional polymer;
b) a poly-carboxylic acid functional polyester polymer reactive with the epoxy functional polymer and which comprises an acid value of less than 100 mg KOH/g; and
c) a poly-carboxylic acid functional (meth)acrylate polymer reactive with the epoxy functional polymer,
wherein the epoxy functional polymer comprises a diglycidyl ether of Bisphenol A,
wherein a weight ratio of the poly-carboxylic acid functional polyester to the poly-carboxylic acid functional (meth)acrylate polymer is 5:1 or greater,
wherein, if a colorant is present, the powder coating composition comprises 35 weight % or less of the colorant, based on the total solids weight of the coating composition,
wherein (i) the coating composition further comprises d) an isocyanate functional crosslinker reactive with a hydroxyl functional reaction product obtained from the epoxy functional polymer, poly-carboxylic acid functional polyester polymer, and poly-carboxylic acid functional (meth)acrylate polymer and/or (ii) a coating formed from the powder coating composition has a dielectric strength of greater than 2.5 kV at a dry film thickness of less than 8 mils.

20. A powder coating composition for preparing a dielectric coating comprising:
a) an epoxy functional polymer;
b) a poly-carboxylic acid functional polyester polymer reactive with the epoxy functional polymer and which comprises an acid value of less than 100 mg KOH/g; and
c) a poly-carboxylic acid functional (meth)acrylate polymer reactive with the epoxy functional polymer,
wherein the epoxy functional polymer comprises a diglycidyl ether of Bisphenol A,
wherein a weight ratio of the poly-carboxylic acid functional polyester to the poly-carboxylic acid functional (meth)acrylate polymer is 1:1 or greater,
wherein, if a colorant is present, the powder coating composition comprises 35 weight % or less of the colorant, based on the total solids weight of the coating composition,
wherein (i) the coating composition further comprises d) an isocyanate functional crosslinker reactive with a hydroxyl functional reaction product obtained from the epoxy functional polymer, poly-carboxylic acid functional polyester polymer, and poly-carboxylic acid functional (meth)acrylate polymer and (ii) a coating formed from the powder coating composition has a dielectric strength of greater than 2.5 kV at a dry film thickness of less than 8 mils.

21. A substrate at least partially coated with a coating formed from the powder coating composition of claim 19, wherein the coating has a dielectric strength of greater than 2.5 kV at a dry film thickness of less than 8 mils.

22. A battery or battery component at least partially coated with a coating formed from the powder coating composition of claim 19.

23. A metal wire at least partially coated with a coating formed from the powder coating composition of claim 19.

24. A substrate at least partially coated with a coating formed from the powder coating composition of claim 20, wherein the coating has a dielectric strength of greater than 2.5 kV at a dry film thickness of less than 8 mils.

25. A battery or battery component at least partially coated with a coating formed from the powder coating composition of claim 20.

26. A metal wire at least partially coated with a coating formed from the powder coating composition of claim 20.

* * * * *